United States Patent
Mestanov et al.

(10) Patent No.: US 10,659,370 B2
(45) Date of Patent: May 19, 2020

(54) WIRELESS LOCAL AREA NETWORK (WLAN) NODE, A WIRELESS DEVICE, AND METHODS THEREIN

(71) Applicant: Telefonaktiebolaget LM Ericsson (publ), Stockholm (SE)

(72) Inventors: Filip Mestanov, Sollentuna (SE); Karl Norrman, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 271 days.

(21) Appl. No.: 15/532,335

(22) PCT Filed: Dec. 4, 2014

(86) PCT No.: PCT/SE2014/051446
§ 371 (c)(1),
(2) Date: Jun. 1, 2017

(87) PCT Pub. No.: WO2016/089264
PCT Pub. Date: Jun. 9, 2016

(65) Prior Publication Data
US 2017/0272368 A1 Sep. 21, 2017

(51) Int. Cl.
*H04W 36/00* (2009.01)
*H04L 12/851* (2013.01)
(Continued)

(52) U.S. Cl.
CPC .............. *H04L 47/24* (2013.01); *H04L 47/41* (2013.01); *H04L 63/105* (2013.01);
(Continued)

(58) Field of Classification Search
CPC ....... H04L 47/24; H04L 47/41; H04L 63/105; H04W 28/08; H04W 36/22; H04W 12/06;
(Continued)

(56) References Cited

U.S. PATENT DOCUMENTS 8,446,830 B2 * 5/2013 Wu .................... H04L 12/66
370/235
2010/0128677 A1 5/2010 Liu et al.
(Continued)

FOREIGN PATENT DOCUMENTS

EP          2645785 A1   10/2013
WO    2012145706 A1   10/2012
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.
(Continued)

*Primary Examiner* — Huy C Ho
(74) *Attorney, Agent, or Firm* — Sage Patent Group

(57) ABSTRACT

A wireless local area network, WLAN, node (400) is adapted to be comprised in an integrated wireless communications network comprising a WLAN and a cellular communications network. The WLAN node (400) comprises a receiving module (401) adapted to receive traffic data from a wireless device. A differentiation module (403) is adapted to determine whether the received traffic data relates to a first traffic type which is to be routed locally within the WLAN or a second traffic type which is to be routed to the cellular communication network. A processing module (405) is adapted to control the handling of the traffic data according to whether the traffic data is determined as relating to the first traffic type or the second traffic type.

19 Claims, 10 Drawing Sheets

(51) Int. Cl.
| | |
|---|---|
| H04W 48/18 | (2009.01) |
| H04W 88/06 | (2009.01) |
| H04W 88/10 | (2009.01) |
| H04W 12/06 | (2009.01) |
| H04W 36/14 | (2009.01) |
| H04L 29/06 | (2006.01) |
| H04W 12/08 | (2009.01) |
| H04W 28/08 | (2009.01) |
| H04W 36/22 | (2009.01) |
| H04L 12/891 | (2013.01) |
| H04W 12/00 | (2009.01) |

(52) U.S. Cl.
CPC ......... *H04W 12/003* (2019.01); *H04W 12/06* (2013.01); *H04W 12/08* (2013.01); *H04W 28/08* (2013.01); *H04W 36/14* (2013.01); *H04W 36/22* (2013.01); *H04W 48/18* (2013.01); *H04W 88/06* (2013.01); *H04W 88/10* (2013.01)

(58) Field of Classification Search
CPC ..... H04W 12/08; H04W 36/14; H04W 48/18; H04W 88/06; H04W 88/10
USPC ...................................... 455/435.2
See application file for complete search history.

(56) References Cited

U.S. PATENT DOCUMENTS

| | | |
|---|---|---|
| 2013/0286826 A1 | 10/2013 | Park et al. |
| 2013/0329714 A1 | 12/2013 | Fan et al. |
| 2014/0043979 A1* | 2/2014 | Etemad ................. H04W 4/70 370/237 |
| 2014/0112193 A1 | 4/2014 | Lee |
| 2018/0227738 A1* | 8/2018 | Gupta ................. H04W 74/02 |

FOREIGN PATENT DOCUMENTS

| | | |
|---|---|---|
| WO | 2012166671 A1 | 12/2012 |
| WO | 2012167184 A2 | 12/2012 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.0.0, Mar. 2014, 1-34.

IEEE, "Part 11: Wireless LAN Medium Access Control (MAC) and Physical Layer (PHY) Specifications", IEEE Standard for Information technology—Telecommunications and information exchange between systems Local and metropolitan area networks—Specific requirements IEEE Std 802.11 2012 (Revision of IEEE Std 802. 11-2007), Mar. 29, 2012, 1-2793.

\* cited by examiner

WIRELESS LOCAL AREA NETWORK (WLAN) NODE, A WIRELESS DEVICE, AND METHODS THEREIN

TECHNICAL FIELD

The embodiments of the present invention relate to a Wireless Local Area Network (WLAN) node, a wireless device and to methods therein, and in particular to how they relate to being adapted for use in an integrated wireless communications network comprising, for example, a WLAN and a cellular communications network.

BACKGROUND

Most current Wireless Local Area Networks, WLAN, or Wi-Fi networks (WLAN and Wi-Fi being used interchangeably in the remainder of this document) are networks that exist totally separate from cellular or mobile communication networks, and can be seen as non-integrated from the perspective of a terminal or user equipment.

Most operating systems (OSs) used in user equipment, for example Android™ and iOS®, support a simple Wi-Fi offloading mechanism whereby a user equipment can immediately switch all its IP traffic to a Wi-Fi network upon the detection of a suitable network with a received signal strength above a certain level. The decision about whether or not to offload to a Wi-Fi network is referred to as an access selection strategy, and the term "Wi-Fi-if-coverage" is used to refer to the aforementioned strategy of selecting a Wi-Fi network whenever such a network is detected. There are several drawbacks of the "Wi-Fi-if-coverage" strategy.

For example, although a user can save previous pass codes for already accessed Wi-Fi Access Points (APs), hotspot login for previously non-accessed APs usually requires user intervention, either by entering the pass code using a Wi-Fi connection manager or using a web interface. The connection manager is software on a user device that is in charge of managing the network connections of the terminal, taking into account user preferences, operator preferences, network conditions, and so on.

A drawback of the Wi-Fi-if-coverage strategy is that no consideration is made of expected user experience, except those considered in a user equipment implemented proprietary solution, and this can lead to a user equipment being handed over from a high data rate mobile network connection to a low data rate Wi-Fi connection. Even though the operating system of a user equipment, or some high level software, is intelligent enough to make the offload decisions only when the signal level on the Wi-Fi is considerably better than the mobile network link, there can still be limitations on the backhaul of the Wi-Fi Access Point (AP) that may end up being a bottleneck.

Another drawback of the Wi-Fi-if-coverage strategy is that no consideration is made of the respective load conditions in the mobile network and Wi-Fi network. As such, a user equipment might still be offloaded to a Wi-Fi access point that is serving several user equipment, while the mobile network (e.g. LTE), to which it was previously connected to, is rather unloaded.

In addition, the Wi-Fi-if-coverage strategy can lead to interruptions of on-going services, for example due to the change of IP address when a user equipment switches to the Wi-Fi network. For example, a user who started a Voice over IP (VoIP) call while connected to a mobile network is likely to experience a call drop when arriving home and the user equipment switches to the Wi-Fi network automatically. Although some applications, for example Spotify®, are intelligent enough to handle this and survive the change of IP address, the majority of current applications cannot. This can place a burden on application developers if they have to ensure service continuity.

Yet a further drawback of the Wi-Fi-if-coverage strategy is that no consideration about the mobility of the user equipment is made. Due to this, a fast moving user equipment can end up being offloaded to a Wi-Fi access point for a short duration, just to be handed back over to the mobile network. This is a particular problem in scenarios such as cafes with open Wi-Fi, where a user walking by or even driving by the cafe might be affected by this. Such ping pong between the Wi-Fi and mobile networks can cause service interruptions as well as generate considerable unnecessary signaling (e.g. towards authentication servers).

Recently, Wi-Fi has been subject to increased interest from cellular network operators, not only as an extension to fixed broadband access, but also in connection with using the Wi-Fi technology as an extension, or alternative to cellular radio access network technologies to handle the always increasing wireless bandwidth demands.

At present, a WLAN node, such as an access point, has limitations when handling traffic data from a user equipment that comprises both WLAN type traffic data (such as local breakout traffic) and cellular type traffic data (such as aggregation traffic).

SUMMARY

It is an aim of the present invention to provide a method and apparatus which obviate or reduce at least one or more of the disadvantages mentioned above.

According to a first aspect of the present invention there is provided a wireless local area network, WLAN, node adapted to be comprised in an integrated wireless communications network comprising a WLAN and a cellular communications network. The WLAN node comprises a receiving module adapted to receive traffic data from a wireless device. The WLAN node further comprises a differentiation module that is adapted to determine whether the received traffic data relates to a first traffic type which is to be routed locally within the WLAN or a second traffic type which is to be routed to the cellular communication network. A processing module is adapted to control the handling of the traffic data according to whether the traffic data is determined as relating to the first traffic type or the second traffic type.

By differentiating the received traffic data according to whether it is the type of traffic data that is to be routed locally within a WLAN or to a cellular communications network, an advantage of this is that the WLAN node, for example an access point, can control more easily how the different types of traffic data are to be handled within the WLAN node.

According to another aspect of the present invention there is provided a method in a Wireless Local Area Network, WLAN, node adapted to be comprised in an integrated wireless communications network comprising a WLAN and a cellular communications network. The method comprises receiving traffic data from a wireless device, and determining whether the received traffic data relates to a first traffic type which is to be routed locally within the WLAN or a second traffic type which is to be routed to the cellular communication network. The handling of the traffic data is controlled according to whether the traffic data relates to the first traffic type or the second traffic type.

According to another aspect of the present invention, there is provided a wireless device comprising a processing module adapted to convey information with traffic data transmitted to a wireless local area network, WLAN, node. The conveyed information identifies a first traffic data type corresponding to traffic data which is to be routed by a WLAN node to a local WLAN, or a second traffic data type corresponding to traffic data which is to be routed by a WLAN node to a cellular communication network.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
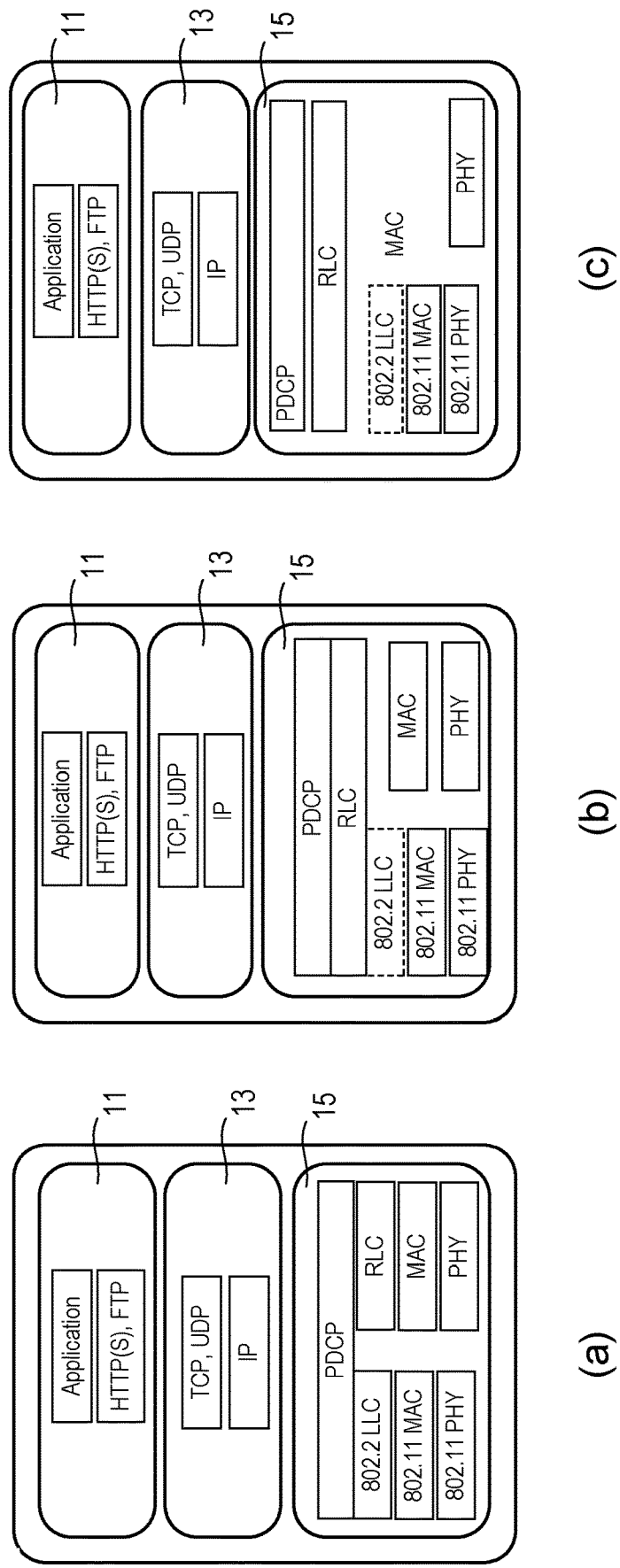
FIG. 1(a) illustrates an example of aggregation between a cellular communication network and Wireless Local Area Network, WLAN, at a Packet Data Convergence Protocol, PDCP, level.
FIG. 1(b) illustrates an example of aggregation between a cellular communication network and WLAN at an Radio Link Control, RLC protocol level.
FIG. 1(c) illustrates an example of aggregation between a cellular communication network and WLAN at a Medium Access Control, MAC, protocol level.

As mentioned above in the background section, Wi-Fi has recently been subject to increased interest from cellular network operators, not only as an extension to fixed broadband access, but also in connection with using the Wi-Fi technology as an extension, or alternative to cellular radio access network technologies to handle the always increasing wireless bandwidth demands. Cellular operators that are currently serving mobile users with, for example, any of the 3GPP technologies, such as LTE, UMTS/WCDMA, or GSM, consider Wi-Fi as a wireless technology that can support their regular cellular communication networks. The term "operator-controlled Wi-Fi" points to a Wi-Fi deployment that on some level is integrated with an existing cellular network operator, and where the 3GPP radio access networks and the Wi-Fi wireless network access may even be connected to the same core network and provide the same services.

There is currently quite intense activity in the area of operator-controlled Wi-Fi in several standardization organizations. In 3GPP, activities to connect Wi-Fi access points to the 3GPP-specified core network are being pursued, and in the Wi-Fi alliance, WFA, activities related to certification of Wi-Fi products are undertaken, which to some extent is also driven from the need to make Wi-Fi a viable wireless technology for cellular operators to support high bandwidth offerings in their networks. The term Wi-Fi offload is commonly used and points towards the notion of cellular network operators seeking to offload traffic from their cellular networks to Wi-Fi, for example during peak traffic times, and in situations when the cellular network, for one reason or another, needs to be off-loaded, for example to provide a requested quality of service, to maximize bandwidth or simply for coverage.

Radio Access Network (RAN) level integration is also being proposed. 3GPP is currently working on specifying a feature/mechanism for WLAN/3GPP Radio interworking which improves operator control with respect to how a user equipment performs access selection and traffic steering between 3GPP and WLANs belonging to the operator or its partners.

It is discussed that for this mechanism the RAN provides assistance parameters that assist a user equipment with the access selection. The RAN assistance information is composed of three main components, namely threshold values, an offloading preference indicator (OPI) and WLAN identifiers. A user equipment is also provided with RAN rules or policies that make use of these assistance parameters.

The threshold values can be used, for example, for metrics such as 3GPP signal related metrics, for example: Reference Signal Received Power (RSRP), Reference Signal Received Quality (RSRQ), Received Signal Code Power (RSCP), Energy per chip over the Noise (EcNo), and/or WLAN signal related metrics such as Received Channel Power Indicator (RCPI), Received Signal Strength Indicator (RSSI), WLAN load/utilization, WLAN backhaul load/capacity, and so on. One example of a RAN rule that uses the threshold value could be that a user equipment should connect to a WLAN if the RSRP is below the signaled RSRP threshold, while at the same time the WLAN RCPI is above the signaled RCPI threshold (it is also discussed that the RAN should provide thresholds for when the user equipment should steer traffic back from WLAN to 3GPP). The RAN rules/policies are expected to be specified in a 3GPP specification such as TS 36.304 v12.0.0 and/or TS 36.331 v12.1.0.

With a mechanism such as the above, it might not be wanted, or maybe not even feasible, that the terminal considers any WLAN when deciding where to steer traffic. For example, it may not be feasible that the terminal uses this mechanism to decide to steer traffic to a WLAN which does not belong to the operator. Hence it has been proposed that the RAN should also indicate to the terminal which WLANs the mechanism should be applied for, by sending WLAN identifiers.

The RAN may also provide additional parameters which are used in Access Network Discovery and Selection Function (ANDSF) policies. One proposed parameter is the offloading preference indicator (OPI). One possibility for OPI is that it is compared to a threshold in the ANDSF policy to trigger different actions. Another possibility is that OPI is used as a pointer to point, and select, different parts of the ANDSF policy which would then be used by the terminal.

The RAN assistance parameters (i.e. thresholds, WLAN identifiers, OPI) provided by RAN may be provided with dedicated signaling and/or broadcast signaling. Dedicated parameters can only be sent to the terminal when having a valid Radio Resource Control, RRC, connection to the 3GPP RAN. A terminal which has received dedicated parameters applies dedicated parameters; otherwise the terminal applies the broadcast parameters. If no RRC connection is established between the terminal and the RAN, the terminal cannot receive dedicated parameters.

In 3GPP, it has been agreed that ANDSF should be enhanced for release-12 to use the thresholds and OPI parameters that are communicated by the RAN to the user equipment, and that if enhanced ANDSF policies are provided to the user equipment, the user equipment will use the ANDSF policies instead of the RAN rules/policies (i.e. ANDSF has precedence).

Within the scope of 3GPP release-13, there has been a growing interest in realizing even tighter integration/aggregation between 3GPP and WLAN (for example, in a similar way as carrier aggregation between multiple carriers in 3GPP, where the WLAN is used just as another carrier). Such an aggregation is expected to make it possible for a more optimal aggregation opportunity as compared to Multipath Transmission Control Protocol, MPTCP, as the aggregation is performed at a lower layer and as such the scheduling and flow control of the data on the WLAN and 3GPP links can be controlled by considering dynamic radio network conditions.

FIGS. 1(a), 1(b) and 1(c) illustrate different levels of integration or aggregation between a cellular communications network (such as 3GPP) and WLAN, and in particular three different protocol options of aggregation at the Packet Data Convergence Protocol (PDCP), Radio Link Control (RLC) and Medium Access Control, MAC, levels, respectively.

FIGS. 1(a), 1(b) and 1(c) show the main principles for these three examples of aggregation levels, although additional functionality may be needed. For example, in the PDCP level aggregation, an additional protocol layer may be used between the PDCP layer and the 802.2 Logical Link Control, LLC, layer to convey information about the user equipment and the radio bearer the traffic is associated with.

It is noted that FIGS. 1(a), 1(b) and 1(c) show the protocol stack at a UE or an integrated/co-located eNB-WLAN access point station. In the case of a standalone access point and eNB (i.e. whereby the access point and eNB are not co-located), the protocol stack for supporting aggregation may be different, as the LLC frames have to be relayed towards a standalone eNB in such a scenario.

Figure 2:
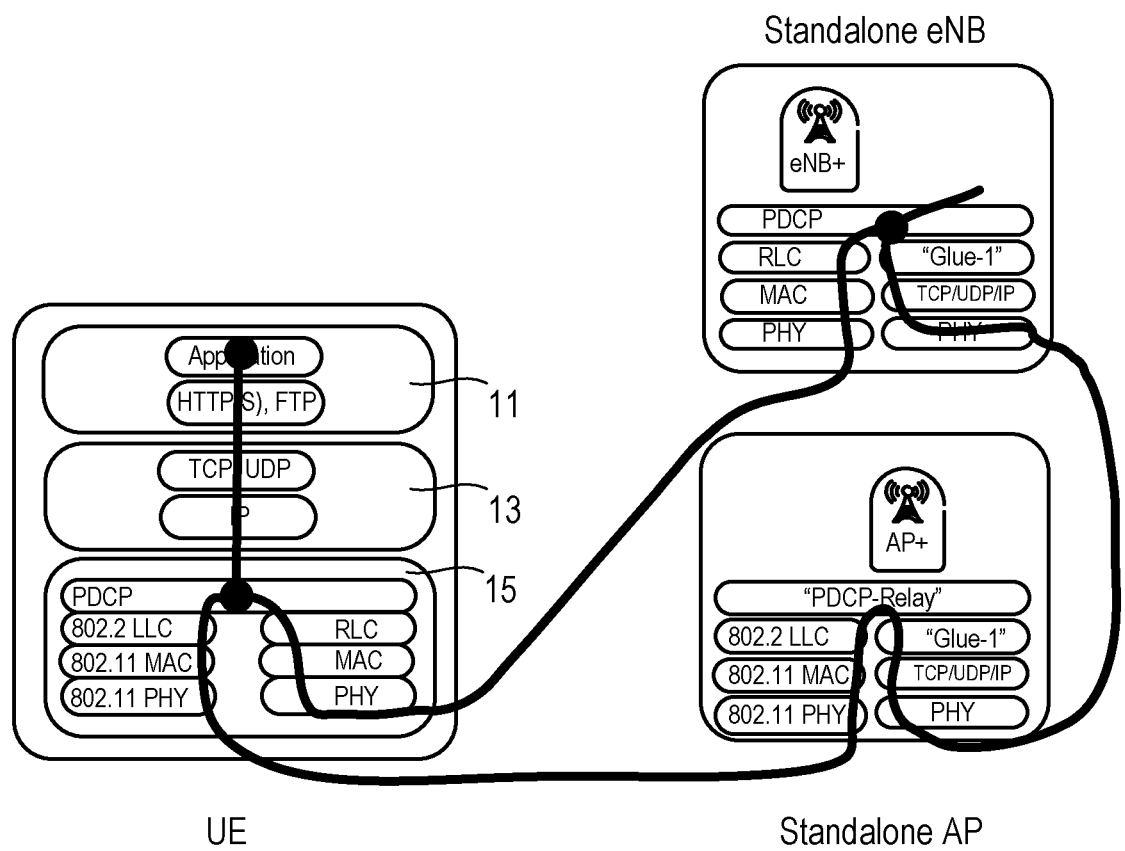
FIG. 2 illustrates an example of PDCP level aggregation with a standalone access point, AP, and standalone eNB.

FIG. 2 is an example illustrating this for the case of PDCP level aggregation. In this case, once the LLC packet is decoded at an access point (in the uplink direction from a user equipment to the access point), and the access point realizes that this packet is a PDCP packet that has to be routed to an eNB, the forwarding can be performed via normal TCP/IP protocol stack.

Figure 3A:
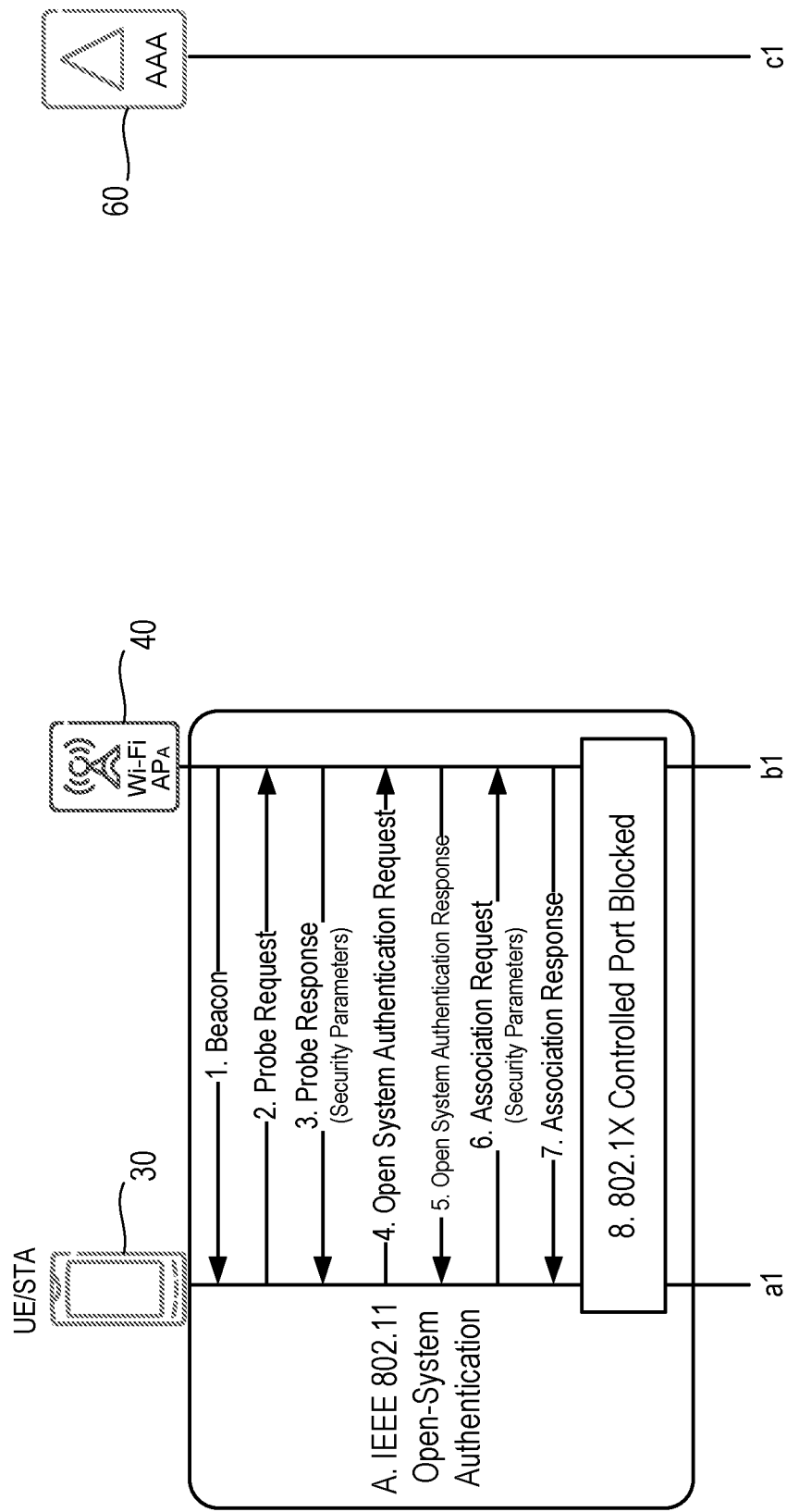
FIG. 3 describes an example of a process flow relating to WLAN that is configured to provide Robust Secure Network, RSN, authentication.
Figure 3B:
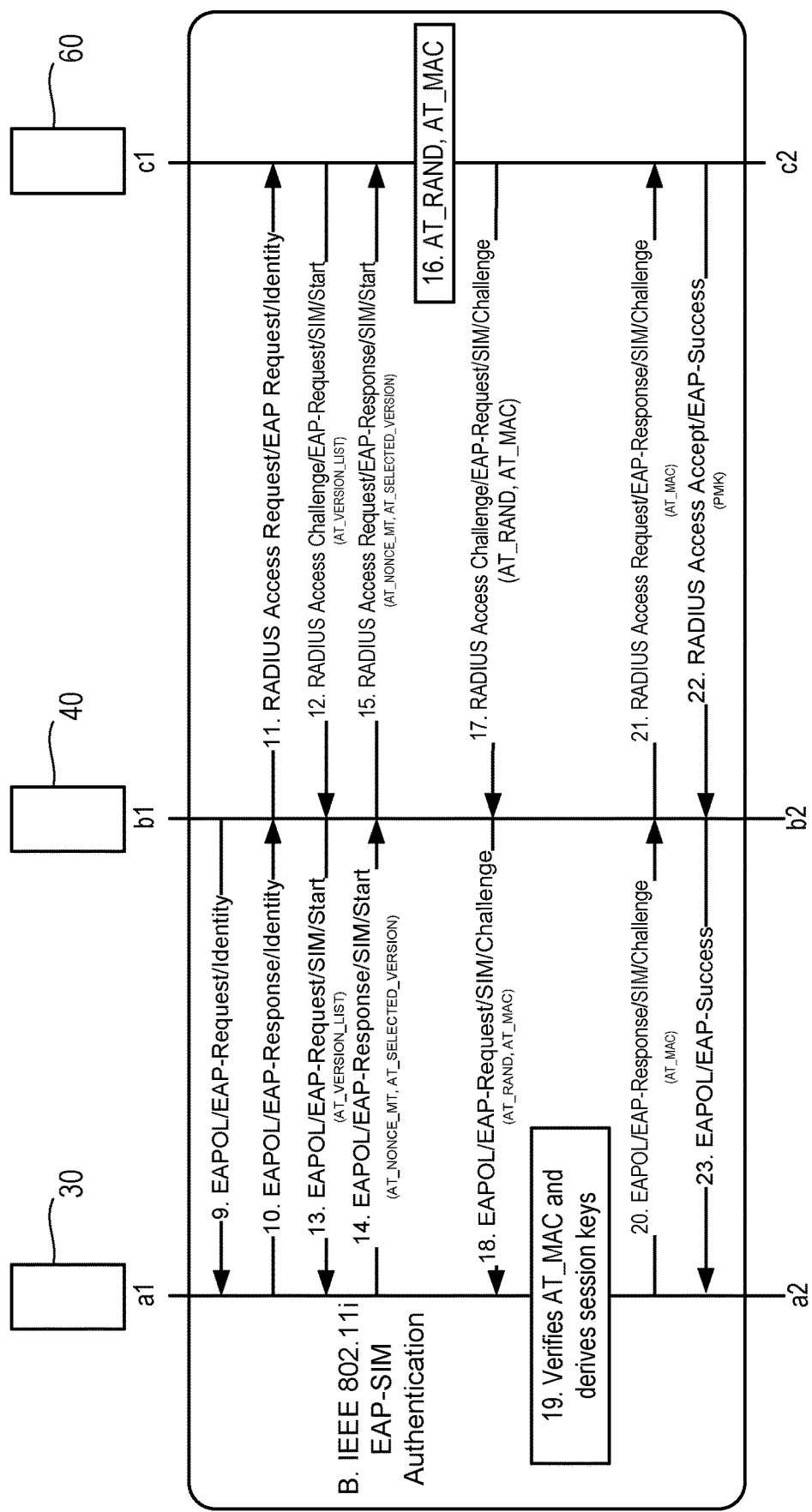
Figure 3C:
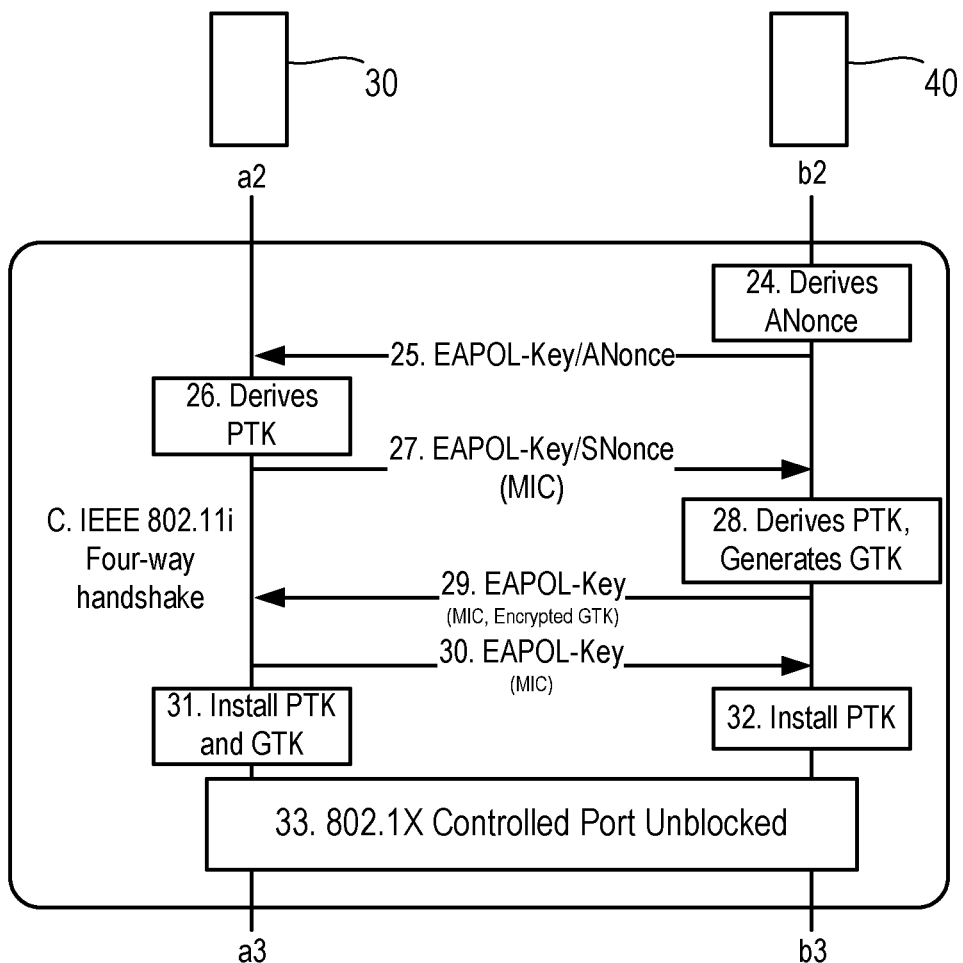

By way of further background, FIGS. 3(a), 3(b) and 3(c) illustrate an example of user equipment attachment and authentication procedures in a WLAN.

The authentication procedure for a user equipment (UE) or station (STA) 30 connecting to a WLAN access point (AP) 40 that employs Robust Security Network, RSN, authentication is depicted in FIGS. 3(a), 3(b) and 3(c).

The authentication procedure comprises the following steps.

Referring in the first instance to FIG. 3a:

Step 1—The STA 30 receives a Beacon frame revealing (among other parameters) the security features associated with the ESS the AP 40 belongs to. The format of the beacon frame as well as all the information elements it carries are described in Chapter 8.3.3.2 of IEEE 802.11, Part 11: "Wireless LAN Medium Access Control (MAC) and Physical Layer (PHY) Specifications", IEEE Std. 802.11-2012, IEEE Computer Society;

Step 2—If the STA 30 does not receive a Beacon frame for some reason, it can generate a Probe Request and send it to the AP 40. This procedure is called active scanning and by performing it, the STA 30 can receive from the AP 40 the same information as it would have from a Beacon message. The Probe Request frame is described in Chapter 8.3.3.9 of IEEE 802.11 (Part 11, as specified above);

Step 3—The AP 40 answers with Probe Response—IEEE 802.11 (Part 11, as specified above), Chapter 8.3.3.10; It is noted that the discovery procedure consists of either step 1 or steps 2 and 3 (i.e., receiving a Beacon frame and exchanging probe messages are mutually exclusive);

Step 4—The STA 30 sends an Open System Authentication Request as defined in Chapter 11.2.3.2 of IEEE 802.11 (Part 11, as specified above);

Step 5—The AP 40 responds with an Open System Authentication Response;

Step 6—The STA 30 then sends an Association Request, indicating the security parameters to be used later;

Step 7—The AP 40 responds with an Association Response. It is noted that the Open System Authentication does not provide any security. The connection between the STA 30 and the AP 40 is secured at a later point, by means of Authentication and Key Agreement procedure. Nevertheless, a possible attack altering the security parameters in the Open System Authentication message exchange will be detected at the stage of key derivation;

Step 8—At this point the Open System Authentication is completed and the STA 30 can communicate only with the AP 40—the rest of the traffic is blocked by the port-based network control (PBNC) enforcer, as defined in IEEE 802.1X. Some of the traffic towards external hosts, however, can be forwarded by the AP 40, as in the case of the communication with a RADIUS server;

Continuing onto FIG. 3b:

Step 9—This step is the first step of the Extensible Authentication Protocol Subscriber Identity Module (EAP-SIM) authentication, as described further in the Internet Engineering Task Force, IETF, RFC 4186. The AP 40 encapsulates an EAP-Request of Type 18 (SIM) inside an EAP-over-LAN (EAPOL) frame, asking the STA 30 to report its identity. In the case when the STA 30 is equipped with a SIM, the identity is the International Mobile Subscriber Identity (IMSI), followed by the "@" sign and the home realm. It is also possible for the STA 30 to include an additional "1" in front of the IMSI in order to indicate preference for the exclusive use of EAP-SIM if other EAP methods are available (e.g., EAP-AKA);

Step 10—The STA 30 responds with its identity. An example of such is: 1234580123000100@wlan.mnc048.mcc264.3gppnetwork.org (and IMSI is in this example 234580123000100 and the preceding "1" indicates the preference to use EAP-SIM);

Step 11—The AP 40 extracts the EAP-Response message, encapsulates it in a RADIUS frame and forwards it to the backend AAA server 60, for example forming part of a cellular architecture. The handling of EAP frames over RADIUS is described further by the IETF in RFC 3579;

Step 12—The AAA server 60 recognizes the EAP method and sends an EAP-Request/SIM/Start, indicating that an EAP-SIM procedure has been initiated for that Supplicant.

It also includes the list of supported SIM versions in the message as described in Chapter 10.2 of RFC 4186;

Step 13—The AP 40 relays the EAP-Request/SIM/Start message to the STA 30;

Step 14—The STA 30 responds with EAP-Response/SIM/Start message, which carries a random number (NONCE_MT) carried in the AT NONCE_MT attribute (a randomly selected number), as well as the selected EAP-SIM version (AT_SELECTED_VERSION);

Step 15—The AP 40 forwards the EAP-Response/SIM/Start to the AAA server 60;

Step 16—The AAA server 60 obtains the GSM triplet (RAND, SRES and Kc) from the HLR/AuC and derives the keying material as specified in Chapter 7 of RFC 4186. The GSM triplet consists of:
a) RAND—a 128-bit random number, generated by the Authentication Center (an entity within the GSM core network, used to authenticate subscribers at the point of initial attach) when a subscriber authentication is requested. Its main use is for the derivation of the Signed Response (SRES) and the Kc;
b) SRES—a 32-bit variable, the expected response from the mobile station/STA 30 after it has been challenged with the RAND;
c) Kc—a 64-bit ciphering key, used to encipher and decipher data transmitted between the STA 30 and the AP 40;

Step 17—The AAA server 60 generates an EAP-Request/SIM/Challenge message, including RAND challenges and message authentication code attribute (AT_MAC). The AT_MAC derivation is based on the RAND and Kc values;

Step 18—The AP 40 forwards the EAP-Request/SIM/Challenge message to the STA 30;

Step 19—The STA 30 feeds the received RAND into the GSM algorithms running on the SIM and the output is a copy of the AT_MAC and a SRES value. The first thing for the STA 30 to do is to check whether the AT_MAC value received by the AAA (relayed by the AP) and the one generated by the SIM match. If so the STA continues with the authentication, otherwise it responds with an EAP-Response/SIM/Client-Error message. The second thing is to derive a new AT_MAC, based on the generated SRES;

Step 20—The new AT_MAC is sent to the AAA server 60 (via the AP 40) in an EAP-Response/SIM/Challenge message;

Step 21—The AP 40 forwards the EAP-Response/SIM/Challenge to the AAA server 60;

Step 22—The AAA server 60 verifies the new AT_MAC value that the STA 30 has just sent. If the verification is successful, it sends an EAP-Success message to the AP 40. The message also carries keying material—Pairwise Master Key (PMK). The PMK is intended for the AP 40 only and it is not forwarded to the STA 30 (the STA 30 can derive the same key autonomously since it is based on the Kc, which the SIM in the STA 30 can compute based on the RAND);

Step 23—The AP 40 forwards the EAP-Success message to the STA 30 and stores the PMK for the following Four-way handshake;

Continuing onto FIG. 3*c:*

Step 24—The AP 40 uses the PMK to generate an Authenticator nonce (ANonce);

Step 25—The ANonce value is sent to the STA 30 in an EAPOL-Key message;

Step 26—Using the received ANonce (together with the SNonce and the PMK), the STA 30 constructs the Pairwise Temporal Key (PTK);

Step 27—The STA 30 sends an EAPOL-Key message to the AP 40, including a Supplicant nonce (SNonce) and a message integrity code (MIC);

Step 28—The AP 40 uses the ANonce, SNonce and the PMK to construct the PTK. The AP 40 also uses the MIC in order to verify that the STA 30 has computed the correct and fresh key. Furthermore, the AP 40 also generates and installs a Group Temporal Key (GTK, which is used exclusively for the encryption and decryption of broadcast and multicast traffic;

Step 29—The AP 40 sends to the STA 30 an encrypted GTK, a sequence number to use for the next broadcast message and an instruction to install the PTK (the message is integrity protected by another MIC);

Step 30—The STA 30 responds with an acknowledgement message;

Step 31—The STA 30 installs both the PTK and the GTK and as of this point uses them to encrypt and decrypt all communication;

Step 32—The AP 40 also installs the PTK;

Step 33—The 802.1X Controlled Port is now open and the STA 30 can communicate with other network hosts besides the AP 40.

In some situations, WLAN network nodes (e.g. Access Points 40) will need to support both aggregation traffic and local breakout traffic simultaneously from the same user equipment or station, (aggregation traffic, for example, being traffic that forms part of traffic intended for a cellular network, and local breakout traffic, for example, being traffic that is for use in the WLAN).

The embodiments of the present invention, as described herein, provide a mechanism which enables WLAN access nodes, or Access Points (APs) to distinguish different types of traffic it receives from a single user equipment or Station (STA), for example, distinguishing aggregation traffic flow from local breakout traffic. Furthermore, according to embodiments of the present invention, a network node such as an access point can then apply different treatment to the different types of traffic. According to one aspect of the invention, the embodiments described herein achieve the separation or differentiation by marking frames in the WLAN air interface as being of different types. The marking may be provided, for example, by indicating the type of traffic using various type and addressing mechanisms in the existing protocols, as will be described in further detail below.

Thus, the embodiments of the present invention have an advantage in that they enable a network node, such as an access point of a WLAN, to differentiate between traffic that should be routed locally from aggregation traffic that should be routed towards an aggregation node.

Figure 4:
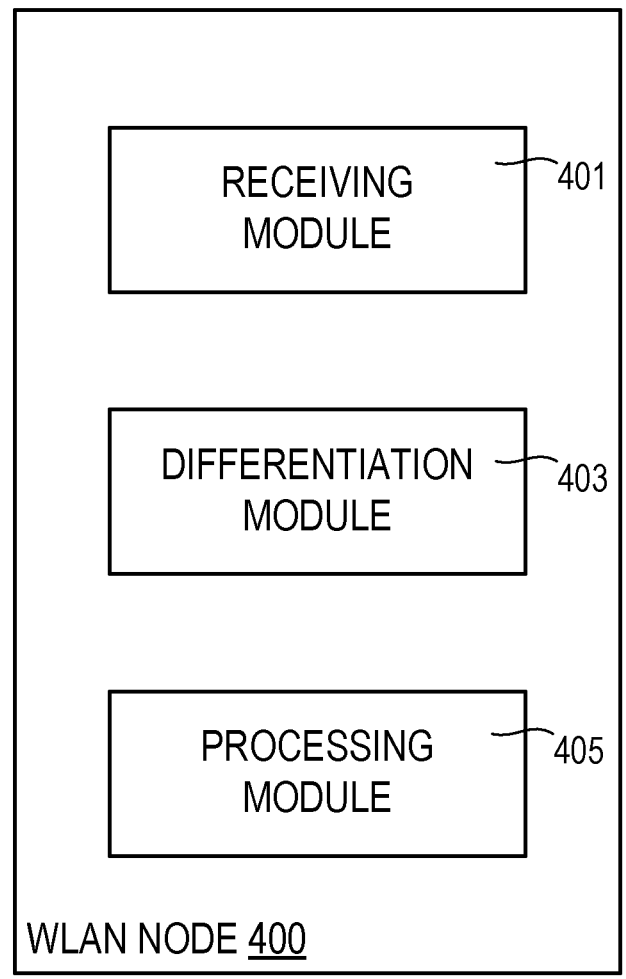
FIG. 4 shows an example of a WLAN node according to an embodiment of the present invention.

FIG. 4 is an example of a wireless local area network, WLAN, node 400 according to an embodiment of the present invention. The WLAN node is adapted to be comprised in an integrated wireless communications network comprising a WLAN and a cellular communications network. The WLAN node 400 comprises a receiving module 401 adapted to receive traffic data from a wireless device. The wireless device may comprise, for example, a user equipment or station, or any other form of device.

The WLAN node further comprises a differentiation module 403 which is adapted to determine whether the received traffic data relates to a first traffic type which is to be routed locally within the WLAN (for example local breakout traffic), or a second traffic type which is to be routed to the cellular communication network (for example aggregation traffic).

A processing module 405 is adapted to control the handling of the traffic data according to whether the traffic data is determined as relating to the first traffic type or the second traffic type.

By being able to differentiate between the first and second types of traffic data (for example between WLAN type traffic and cellular type traffic, such as non-aggregation type traffic or aggregation type traffic), this has the benefit of enabling the WLAN node to handle the traffic differently, e.g. by applying different security provisions, or priority handling, or encryption or authentication to the different types of traffic data.

The handling of the received traffic data is therefore controlled according to whether the traffic has been determined as relating to the first traffic type which is intended to be routed locally within the WLAN or the second traffic type which is intended to be routed to another node, such as an aggregation node of a cellular communications network.

According to one embodiment, the differentiation module 403 is adapted to determine the type of traffic data using a fundamental frame type value that is specifically provided for differentiating between the first type of traffic data and the second type of traffic data.

In one embodiment the aggregation traffic may be carried within a specially defined IEEE 802.11 frame (referred to herein as an Aggregation Frame). Currently, there are three fundamental types of frames defined in the IEEE 802.11 standard (see table 8-1 of IEEE 802.11-2012 [Part 11, as specified earlier]), which comprise:

1. Management frames (e.g. Probe, Association, Authentication, etc.)
2. Control frames (e.g. RTS, CTS, ACK, etc.)
3. Data frames (e.g. Data, QoS Data, etc.)

Thus, one option to implement an embodiment of the present invention, while also complying with current IEEE standards, is to define a new fundamental frame type (in addition to three described above). Currently, the Type Value of "11" (binary notation) is reserved for future use and, according to one embodiment, this value is adopted to implement the Aggregation Frame.

In other words, an unused fundamental frame type value, e.g. 11, may be used as a specific fundamental frame type value to convey what type of traffic data is received at the access point.

According to another embodiment, the differentiation module 403 is adapted to determine the type of traffic data from a fundamental frame type value which is used to convey some other form of frame type (e.g. use one of the three existing fundamental frame type values mentioned above), and wherein the fundamental frame type value is adapted to comprise a sub-frame value, wherein the sub-frame value indicates whether the traffic data relates to the first traffic type or the second traffic type.

According to this embodiment one of the existing fundamental frame types is used, with the existing fundamental frame type amended to comprise a new sub-type. An example of such an implementation is taking the Data frame type ("10") and defining a new sub-type within the Data type. Currently the value "1101", for example, is reserved for future use with the Data frame type "10", and according to one embodiment the value "1101" may therefore be used as the option for implementing the Aggregation Frame. In such an embodiment a sub-frame value defines a data type relating to a cellular communication network. It is noted that other existing fundamental frame type values or other sub-type values may also be used.

According to another embodiment, the differentiation module 403 is adapted to determine the type of traffic data using information provided in a logical link layer, LLC. In such an embodiment the LLC layer is used at the access point in order to distinguish between the aggregation and local breakout traffic.

In one example, one option to implement this with compliance to the currently existing standard procedures is to introduce a new Link Service Access point (LSAP) for the purposes of aggregation (e.g. where all aggregation traffic will be carried under LLC frames marked with the new LSAP. Therefore, in such an embodiment the logical link layer comprises a link service access point, LSAP, wherein the LSAP indicates whether the traffic data relates to the first traffic type or the second traffic type.

According to another embodiment, the differentiation module 403 is adapted to determine the type of traffic data using an extension provided to a logical link control, LLC, wherein the extension indicates whether the traffic data relates to the first traffic type or the second traffic type.

For example, in one embodiment the extension provided to a logical link control comprises a sub-network access protocol, SNAP, wherein the sub-network access protocol indicates whether the traffic data relates to the first traffic type or the second traffic type. As an example, a new SNAP protocol number can be assigned in order to encapsulate all aggregation traffic. In this case, a WLAN node, having decoded the LLC+SNAP header will know if the frame is an aggregation frame.

According to another embodiment, the differentiation module 403 is adapted to determine the type of traffic data using virtual local area network tagging, wherein a dedicated virtual local area network is provided for the second type of traffic data. For example, 802.1Q (VLAN) tagging may be used for differentiation between the aggregation and the local breakout traffic types. A special VLAN can be created for the aggregation traffic.

According to yet another embodiment, the differentiation module 403 is adapted to determine the type of traffic data based on a received MAC address of the wireless device, wherein the wireless device comprises a first MAC address relating to the first traffic data type, and a second MAC address relating to the second traffic data type. In such an embodiment, a user equipment uses different MAC addresses for the different traffic types, as will be described in further detail later in the application.

It is noted that although various method have been described above for marking a frame such that it can be identified as either local breakout type traffic or cellular type traffic, such as aggregation type traffic, other methods of identifying a frame may also be used without departing from the scope of the invention as defined in the appended claims.

Since a WLAN node 400 is able to distinguish different types of traffic in this way, the WLAN node is also able to control the handling of the received traffic data accordingly.

For example, in one embodiment the processing module 405 is adapted to control the handling of the traffic by performing at least one of the following.

In one example, the processing module 405 is adapted to transmit traffic data of the first type to a local node of the WLAN using a first level of security, and transmit traffic data of the second type to a node of the cellular communications network using a second level of security. The different levels of security can refer to different robustness of security, for example Open System Authentication (OSA) compared to Robust Secure Network (RSN) Authentication, or even some form of security compared to no security being provided.

In one example the processing module 405 is adapted to transmit traffic data of the first type to a local node of the WLAN using a first level of encryption, and transmit traffic data of the second type to a node of the cellular communications network using a second level of encryption.

In one example the processing module 405 is adapted to transmit traffic data of the first type to a local node of the WLAN using a first level of priority, and transmit traffic data of the second type to a node of the cellular communications network using a second level of priority.

In one example the processing module 405 is adapted to transmit traffic data of the first type to a local node of the WLAN using a first level of authentication, and transmit traffic data of the second type to a node of the cellular communications network using a second level of authentication.

It is noted that any one or more of the above may be used in any combination, or in isolation.

Furthermore, at least one of the following may apply. In one example the first level of security is lower than the respective second level of security, or vice versa. In one example the first level of encryption is lower than the respective second level of encryption, or vice versa. In another example the first level of priority is lower than the respective second level of priority, or vice versa. In another example the first level of authentication is lower than the respective second level of authentication, or vice versa. The higher and lower features may be used in any combination. For example, in one scenario the first traffic data may comprise low security and low priority while the second traffic data comprises high security and high priority, while in another scenario the first traffic data may comprise low security and high priority while the second traffic data comprises high security and low priority. Any other combination may also be used.

Figure 5:
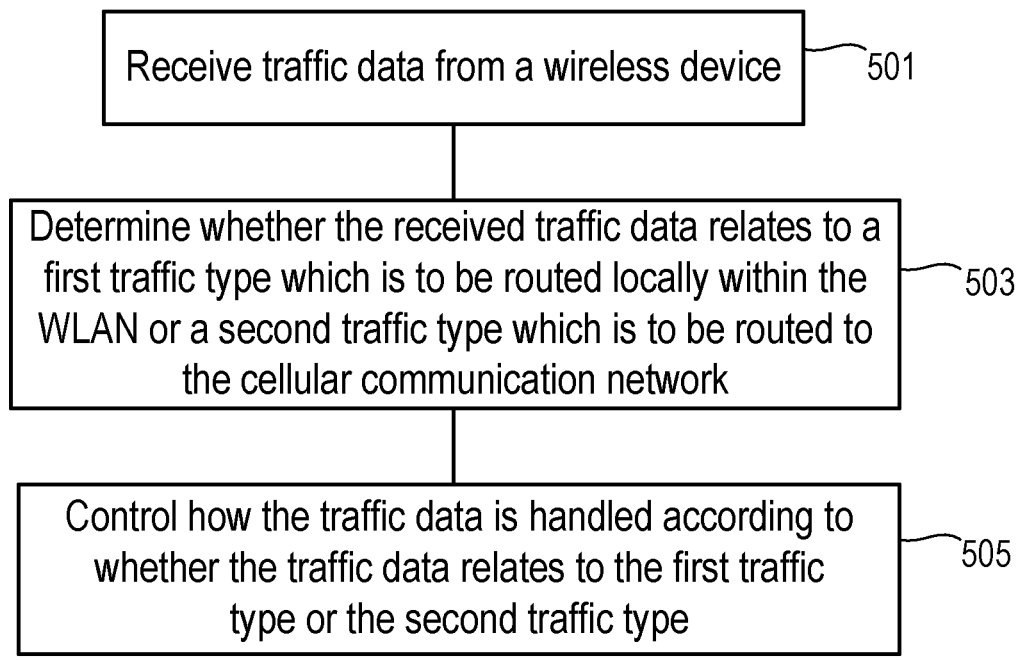
FIG. 5 shows an example of a method according to an embodiment of the present invention.

FIG. 5 shows a method in a Wireless Local Area Network, WLAN, node 400 adapted to be comprised in an integrated wireless communications network comprising a WLAN and a cellular communications network. The method comprises receiving traffic data from a wireless device, step 501. In step 503 the method comprises determining whether the received traffic data relates to a first traffic type which is to be routed locally within the WLAN or a second traffic type which is to be routed to the cellular communication network. The method comprises controlling how the traffic data is handled according to whether the traffic data relates to the first traffic type or the second traffic type, step 505.

The step of determining the traffic type may comprise one or more of:
- determining the type of traffic data using a fundamental frame type value that is specifically provided for differentiating between the first type of traffic data and the second type of traffic data;
- determining the type of traffic data from a fundamental frame type value which is used to convey some other form of frame type, and wherein the fundamental frame type value has been adapted to comprise a sub-frame value, wherein the sub-frame value indicates whether the traffic data relates to the first traffic type or the second traffic type;
- determining the type of traffic data using information provided in a logical link layer, LLC;
- determining the type of traffic data using an extension provided to a logical link control, wherein the extension indicates whether the traffic data relates to the first traffic type or the second traffic type;
- determining the type of traffic data using virtual local area network tagging, wherein a dedicated virtual local area network is provided for the second type of traffic data; or
- determining the type of traffic data based on a received MAC address of the wireless device, wherein the wireless device comprises a first MAC address relating to the first traffic data type, and a second MAC address relating to the second traffic data type.

The method may further comprise the steps of transmitting traffic data of the first type to a local node of the WLAN using a first level of security, and transmitting traffic data of the second type to a node of the cellular communications network using a second level of security.

The method may further comprise the steps of transmitting traffic data of the first type to a local node of the WLAN using a first level of encryption, and transmitting traffic data of the second type to a node of the cellular communications network using a second level of encryption.

The method may further comprise the steps of transmitting traffic data of the first type to a local node of the WLAN using a first level of priority, and transmitting traffic data of the second type to a node of the cellular communications network using a second level of priority.

The method may further comprise the steps of transmitting traffic data of the first type to a local node of the WLAN using a first level of authentication, and transmitting traffic data of the second type to a node of the cellular communications network using a second level of authentication.

Figure 6:
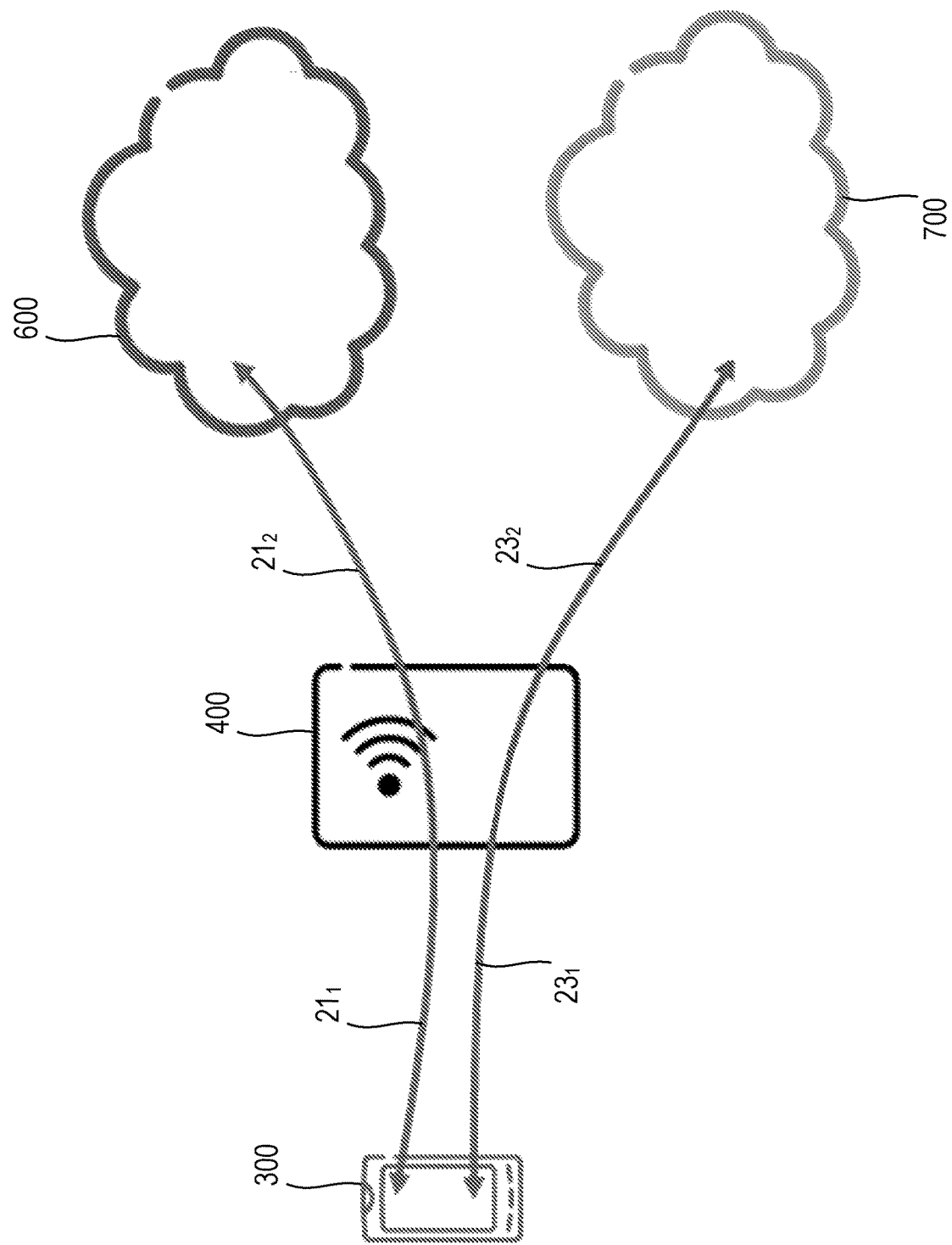
FIG. 6 shows an example of a network comprising a WLAN node and a wireless device according to an embodiment of the present invention.

FIG. 6 shows an example of a network, illustrating how a WLAN node 400 according to an embodiment of the present invention may be used to provide capabilities and route traffic between a wireless device 300 according to an embodiment of the present invention and a first network 700 (for example a WLAN for handling Internet traffic, home or enterprise network traffic) and a second network 600 (for example handling traffic of a cellular communications network). The WLAN node 400 is able to distinguish different types of traffic coming from the same user equipment 300, and hence be able to apply different treatment to those traffic types (e.g., different over-the-air encryption mechanisms could be applied to the aggregation traffic $21_1/21_2$ compared to the local breakout traffic $23_1/23_2$ in order to reduce management overhead in cases when higher layer security mechanisms, e.g., a PDCP one, already assures data integrity for the aggregation traffic).

The WLAN node 400 is able to differentiate both traffic types. One such example is the case where the WLAN node 400 has to use different types of security for both traffic flows when they are associated with the same wireless device 300. Since the 3GPP aggregation traffic is frequently secured by higher layer protocols (e.g. the PDCP) no security is needed over the WLAN air interface $21_2$ for the traffic that is routed towards an 3GPP aggregator 600 (the traffic between the WLAN node 400 and the 3GPP aggregator 600 could be protected by, for example, IPsec to ensure that only traffic from authorized WLAN nodes 400 are allowed to reach the 3GPP aggregator 600). In the case where no security is applied to the aggregation flow over-the-air, the WLAN node 400 may be configured to use Open System Authentication, OSA, for authentication for these flows. However, since the local breakout traffic is not protected by the 3GPP security, the WLAN node 400 can provide security for this traffic over the air interface $23_1/23_2$. This ability to provide one level of security to traffic flows of the first type and a second level of security to traffic levels of the second type is made possible by the WLAN node 400 being able to distinguish between the aggregation and the local breakout traffic.

Figure 7:
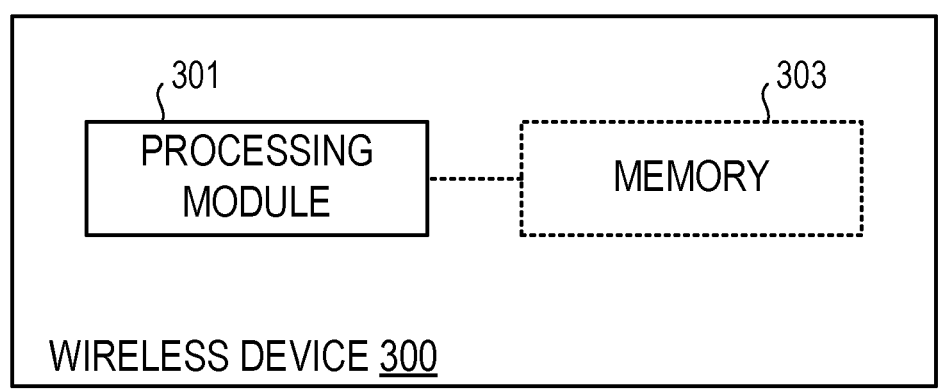
FIG. 7 shows an example of a wireless device according to an embodiment of the present invention.

FIG. 7 shows a wireless device 300 according to another embodiment of the present invention. The wireless device may comprise a user equipment, station, or any other form of device. The wireless device comprises a processing module 301 adapted to convey information with traffic data transmitted to a wireless local area network, WLAN, node. The conveyed information identifies: a first traffic data type corresponding to traffic data which is to be routed by a WLAN node to a local WLAN; or a second traffic data type corresponding to traffic data which is to be routed by a WLAN node to a cellular communication network.

In this manner a wireless device is able to simultaneously transmit traffic of different types while identifying the type of traffic data being transmitted, such that another node, such as an access point of a WLAN, can take appropriate action upon receipt of the traffic data.

In one embodiment, the processing module 301 of the wireless device 300 is adapted to convey the information identifying the first traffic date type and the second traffic data type using a fundamental frame type value that is specifically provided for differentiating between the first type of traffic data and the second type of traffic data. In another embodiment, the processing module 301 is adapted to convey the information identifying the first traffic date type and the second traffic data type using a fundamental frame type value which is used to convey some other form of frame type, and wherein the fundamental frame type value has been adapted to comprise a sub-frame value, wherein the sub-frame value indicates whether the traffic data relates to the first traffic type or the second traffic type.

In another embodiment, the processing module 301 is adapted to convey the information identifying the first traffic date type and the second traffic data type using information provided in a logical link control, LLC layer, for example wherein the logical link control layer comprises a link service access point, LSAP, and wherein the LSAP indicates whether the traffic data relates to the first traffic type or the second traffic type.

In another embodiment, the processing module 301 is adapted to convey the information identifying the first traffic date type and the second traffic data type using an extension provided to a logical link control, wherein the extension indicates whether the traffic data relates to the first traffic type or the second traffic type. For example, an extension may be provided to a logical link control, wherein the extension comprises a sub-network access protocol, SNAP, wherein the sub-network access protocol indicates whether the traffic data relates to the first traffic type or the second traffic type.

In another embodiment the processing module 301 is adapted to convey the information identifying the first traffic date type and the second traffic data type using virtual local area network tagging, wherein a dedicated virtual local area network is provided for the second type of traffic data.

In one embodiment the wireless device 300 comprises a memory 303, the memory storing a first MAC address for identifying the first traffic data type and a second MAC address for identifying the second traffic data type.

Figure 8:
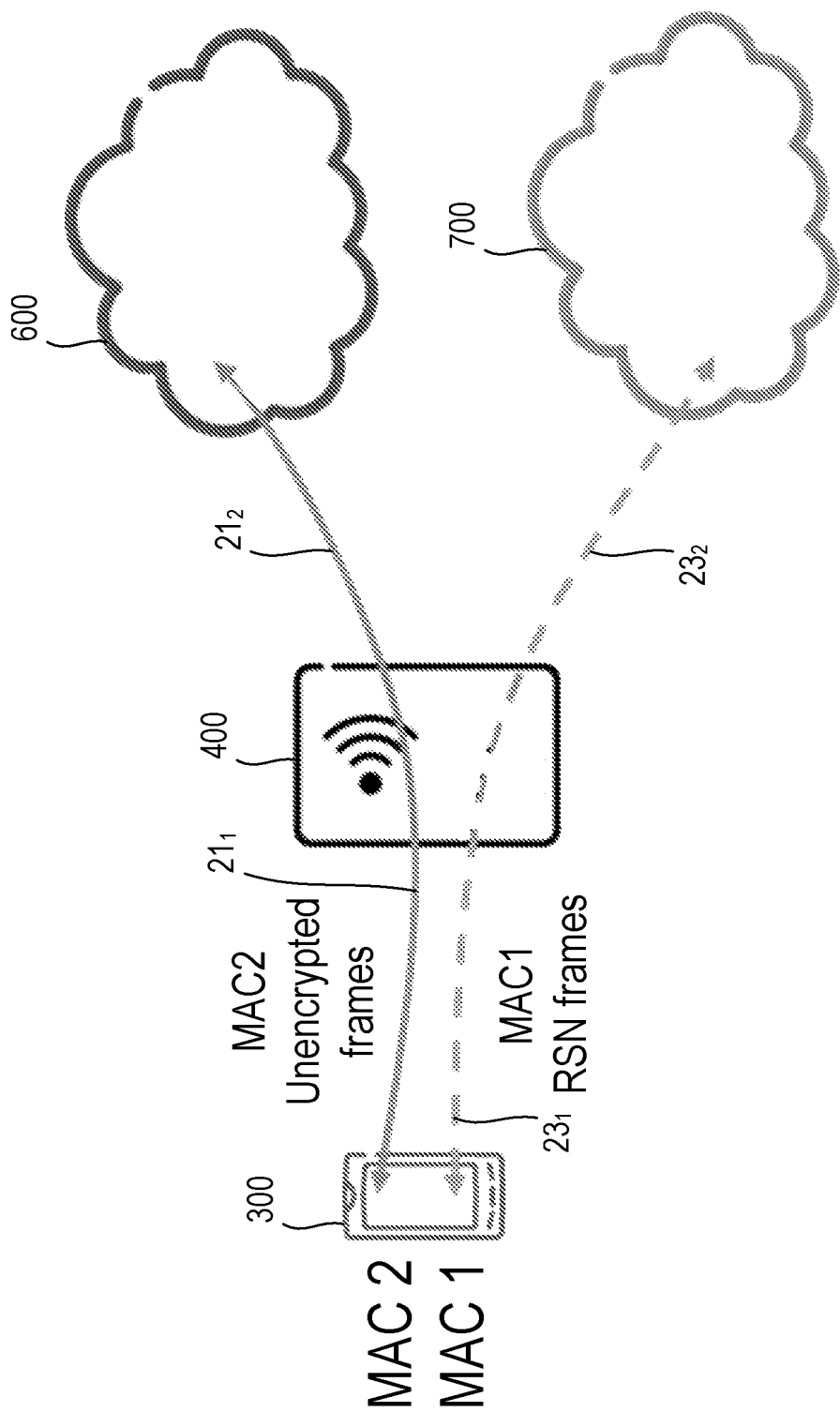
FIG. 8 shows an example of another network comprising a WLAN node and a wireless device according to an embodiment of the present invention.

In such an embodiment, a user equipment uses different MAC addresses for the different traffic types, as illustrated in FIG. 8. FIG. 8 is similar to FIG. 6, in that it shows an example of a network illustrating how a WLAN node 400, according to an embodiment of the present invention, may be used to provide capabilities and route traffic between a wireless device 300 and a first network 700 (for example a WLAN, connected for example to the internet) and a second network 600 (for example an aggregation node of a cellular communications network).

In the example of FIG. 8, whereby the wireless device comprises a first MAC address for identifying the first traffic data type and a second MAC address for identifying the second traffic data type a first, from the point of view of the WLAN node 400, this enables the WLAN node 400 to effectively see two different wireless devices 300 (one identified by MAC1 and one by MAC2) that are requesting simultaneous authentication and subsequently route traffic at the same time. However, from the perspective of the wireless device this is quite different, since the wireless device 300 needs to be a multi-address wireless device, i.e. support more than one MAC address at the same time. In this example the wireless device will use MAC1 as a source address when routing non-aggregation traffic (local breakout traffic) towards the WLAN node 400, and the WLAN node 400 will do the same when routing non-aggregation traffic towards the wireless device 300. In a similar manner, MAC2 is used by the wireless device 300 as the source address when routing aggregation traffic (cellular type traffic) towards the WLAN node 400, and the WLAN node 400 will do the same when routing aggregation traffic towards the wireless device 300. In this case, the WLAN node 400 and wireless device 300 do not need to apply higher layer traffic inspection and separation, but can instead reuse the already existing MAC mechanisms. This has an advantage of being able to handle traffic flows with less management overhead.

The embodiments described above can allow a user equipment or WLAN node to differentiate the level of security required on the air-interface for different traffic flows, and hence saves battery lifetime of the wireless device (for example by avoiding the need to apply additional security to certain types of traffic). As illustrated in FIG. 8, traffic flows $21_1/21_2$ relating to cellular type traffic, which already has a level of encryption or security, can be routed without adding any further type of encryption or security, whereas traffic flows $23_1/23_2$ relating to local breakout traffic, which does not already include encryption or security, may be adapted to include some form of authentication, for example RSN authentication.

Figure 9:
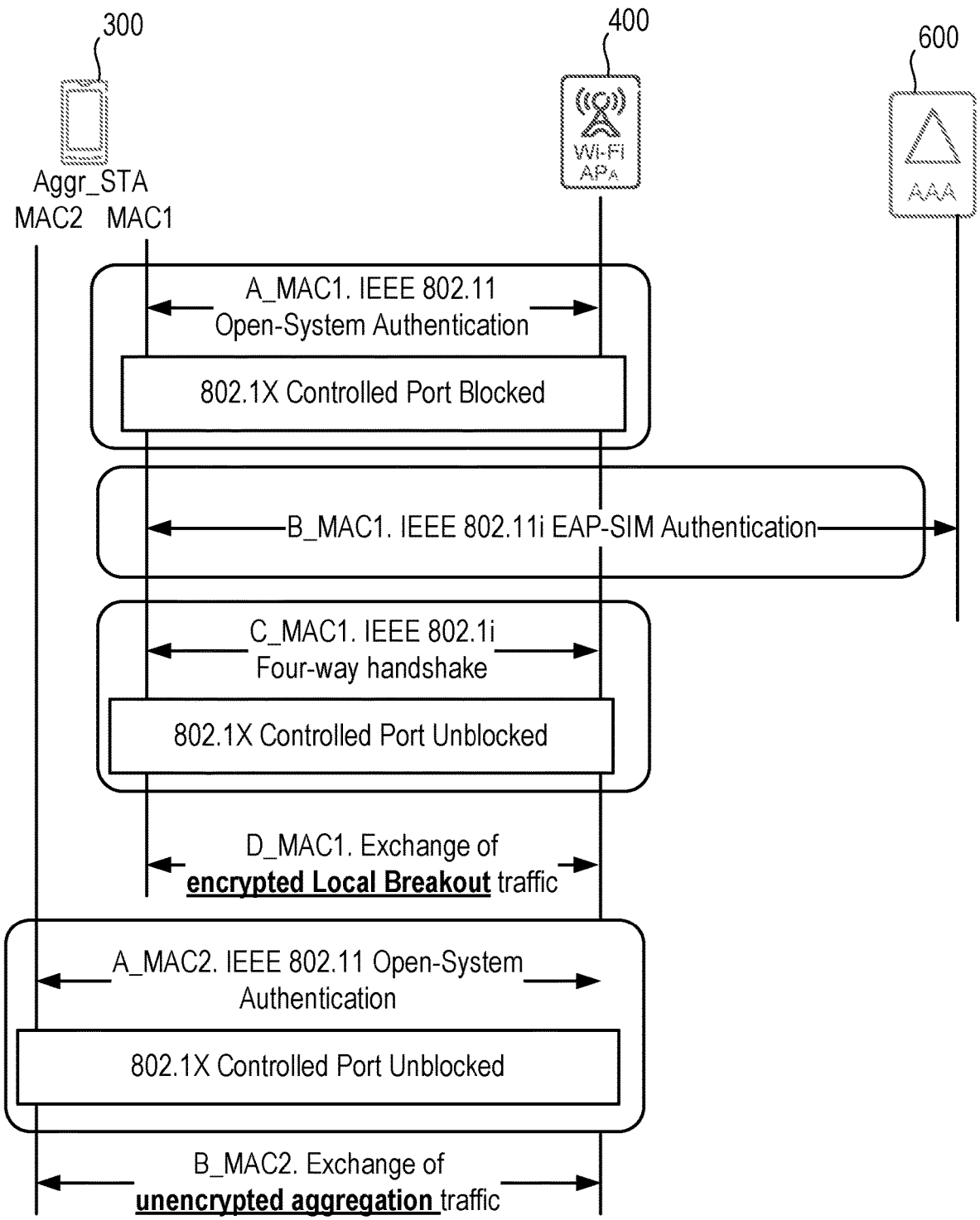
FIG. 9 shows an example of a WLAN node supporting RSN and Open System Authentication, OSA, concurrently, according to an embodiment of the present invention.

FIG. 9 shows an example of a WLAN node supporting RSN and Open System Authentication, OSA, concurrently, according to an embodiment of the present invention. In the example of FIG. 9 the wireless device 300 uses two MAC addresses simultaneously (and two authentications). FIG. 9 illustrates, as mentioned above, how the MAC1 address is used for non-aggregation type traffic, and how this can be used to provide encrypted local breakout traffic between a wireless device 300 and WLAN node 400, while MAC2 is used as an address for aggregation type traffic, to provide the exchange of unencrypted aggregation traffic between the wireless device 300 and WLAN node 400.

From the embodiments described above it can be seen that there is provided separation between different traffic types (e.g. the aggregation and the non-aggregation ones), which enables different treatment by a WLAN node.

It is noted that in the embodiments described herein, the first traffic type is described as comprising non-aggregation traffic or local breakout traffic for the WLAN, while the second traffic type is described as comprising traffic data relating to cellular type traffic for the cellular communications network, such as aggregation traffic. It is noted, however, that the first and second traffic types may comprise any form of different types. It is also noted that one or more further traffic types may be used, with any third or higher form of different traffic type being controlled or handled according to rules or procedures for that specific traffic type(s).

According to another aspect of the present invention, there is also provided a computer program, comprising instructions which, when executed on at least one processor, causes the at least one processor to carry out the method according to any one of the embodiments described herein, and claimed in the appended claims.

According to ne embodiment there is also provided a carrier comprising such a computer program, wherein the carrier is one of an electronic signal, optical signal, radio signal or computer readable storage medium.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A Wireless Local Area Network Access Point (WLAN AP) configured for operation in an integrated wireless communications network comprising a WLAN and a cellular communications network, the WLAN AP comprising:
   communication circuitry configured to receive traffic data from a wireless device, the traffic data incoming to the WLAN AP via a WLAN air interface; and
   processing circuitry operatively associated with the communication circuitry and configured to:
   determine whether the traffic data is a first traffic type to be routed locally within the WLAN or a second traffic type to be routed to the cellular communication network; and
   control how the traffic data is handled according to the determination of whether the traffic data is the first traffic type or the second traffic type,
   wherein the processing circuitry is configured to determine the type of the traffic data using an extension provided in a logical link control (LLC) layer, wherein the extension indicates whether the traffic data is the first traffic type or the second traffic type.

2. The WLAN AP as claimed in claim 1, wherein the processing circuitry is configured to determine the type of the traffic data using a fundamental frame type value that is specifically provided for differentiating between the first traffic type and the second traffic type.

3. The WLAN AP as claimed in claim 1, wherein the processing circuitry is configured to determine the type of the traffic data from a fundamental frame type value that is used to convey some other form of frame type, and wherein the fundamental frame type value comprises a sub-frame value, wherein the sub-frame value indicates whether the traffic data is the first traffic type or the second traffic type.

4. The WLAN AP as claimed in claim 3, wherein the sub-frame value defines a data type relating to a cellular communication network.

5. The WLAN AP as claimed in claim 1, wherein the information provided in the LLC layer comprises a link service access point (LSAP), wherein the LSAP indicates whether the traffic data is the first traffic type or the second traffic type.

6. The WLAN AP as claimed in claim 1, wherein the extension provided in the LLC layer comprises sub-network access protocol (SNAP), wherein the SNAP indicates whether the traffic data is the first traffic type or the second traffic type.

7. The WLAN AP as claimed in claim 1, wherein the processing circuitry is configured to determine the type of the traffic data using virtual local area network tagging, wherein a dedicated virtual local area network is provided for the second traffic type.

8. The WLAN AP as claimed in claim 1, wherein the processing circuitry is configured to determine the type of the traffic data based on a received media access control (MAC) address of the wireless device, wherein the wireless device comprises a first MAC address relating to the first traffic type, and a second MAC address relating to the second traffic type.

9. The WLAN AP as claimed in claim 1, wherein the processing circuitry is configured to control how the traffic data is handled by performing at least one of:
   transmitting traffic data of the first traffic type to a local node of the WLAN using a first level of security, and transmitting traffic data of the second traffic type to a node of the cellular communications network using a second level of security;
   transmitting traffic data of the first traffic type to a local node of the WLAN using a first level of encryption, and transmitting traffic data of the second traffic type to a node of the cellular communications network using a second level of encryption;
   transmitting traffic data of the first traffic type to a local node of the WLAN using a first level of priority, and transmitting traffic data of the second traffic type to a node of the cellular communications network using a second level of priority; and
   transmitting traffic data of the first traffic type to a local node of the WLAN using a first level of authentication, and transmitting traffic data of the second traffic type to a node of the cellular communications network using a second level of authentication.

10. The WLAN AP as claimed in claim 9, wherein at least one of the following apply:
    the first level of security is lower than the respective second level of security, or vice versa;
    the first level of encryption is lower than the respective second level of encryption, or vice versa;
    the first level of priority is lower than the respective second level of priority, or vice versa; and
    the first level of authentication is lower than the respective second level of authentication, or vice versa.

11. The WLAN AP as claimed in claim 1, wherein:
    the first traffic type comprises non-aggregation traffic or local breakout traffic for the WLAN; and
    the second traffic type comprises traffic data relating to aggregation traffic for the cellular communications network.

12. A method in a Wireless Local Area Network Access Point (WLAN AP) operating in an integrated wireless communications network comprising a WLAN and a cellular communications network, the method comprising:
    receiving traffic data from a wireless device, the traffic data incoming to the WLAN AP over a WLAN air interface;
    determining whether the traffic data is a first traffic type to be routed locally within the WLAN or a second traffic type to be routed to the cellular communication network; and controlling how the traffic data is handled according to whether the traffic data is the first traffic type or the second traffic type, determining the type of the traffic data using an extension provided in an LLC layer, wherein the extension indicates whether the traffic data is the first traffic type or the second traffic type.

13. The method as claimed in claim 12, wherein determining the type of the traffic data comprises one or more of:

determining the type of the traffic data using a fundamental frame type value that is specifically provided for differentiating between the first traffic type and the second traffic type;

determining the type of the traffic data from a fundamental frame type value that is used to convey some other form of frame type, and wherein the fundamental frame type value comprises a sub-frame value, wherein the sub-frame value indicates whether the traffic data is the first traffic type or the second traffic type;

determining the type of the traffic data using information provided in a logical link control (LLC) layer;

determining the type of the traffic data using virtual local area network tagging, wherein a dedicated virtual local area network is provided for the second traffic type; and determining the type of the traffic data based on a received media access control (MAC) address of the wireless device, wherein the wireless device comprises a first MAC address relating to the first traffic type, and a second MAC address relating to the second traffic type.

14. The method as claimed in claim 12, further comprising at least one of:

transmitting traffic data of the first traffic type to a local node of the WLAN using a first level of security, and transmitting traffic data of the second traffic type to a node of the cellular communications network using a second level of security;

transmitting traffic data of the first traffic type to a local node of the WLAN using a first level of encryption, and transmitting traffic data of the second traffic type to a node of the cellular communications network using a second level of encryption;

transmitting traffic data of the first traffic type to a local node of the WLAN using a first level of priority, and transmitting traffic data of the second traffic type to a node of the cellular communications network using a second level of priority; and transmitting traffic data of the first traffic type to a local node of the WLAN using a first level of authentication, and transmitting traffic data of the second traffic type to a node of the cellular communications network using a second level of authentication.

15. A wireless device comprising:

a memory storing instructions; and processing circuitry configured for executing the instructions, whereby the wireless device is configured to:

convey information with traffic data transmitted by the wireless device to a Wireless Local Area Network Access Point (WLAN AP) over a WLAN air interface, wherein the conveyed information identifies the traffic data as being one of:

a first traffic type to be routed by the WLAN AP to a local WLAN; and a second traffic type to be routed by the WLAN AP to a cellular communication network, wherein the memory stores a first media access control (MAC) address for identifying the first traffic type and a second MAC address for identifying the second traffic type, wherein the processing circuitry is configured to convey the information identifying one of the first traffic type and the second traffic type using information provided in a logical link control (LLC) layer.

16. The wireless device as claimed in claim 15, wherein the processing circuitry is configured to convey the information identifying the first traffic type or the second traffic type using one of:

a fundamental frame type value that is specifically provided for differentiating between the first traffic type and the second traffic type; and a fundamental frame type value that is used to convey some other form of frame type, wherein the fundamental frame type value comprises a sub-frame value, and wherein the sub-frame value indicates whether the traffic data is the first traffic type or the second traffic type.

17. The wireless device as claimed in claim 15, wherein the information provided in the LLC layer comprises one of:

a link service access point (LSAP), wherein the LSAP indicates whether the traffic data is the first traffic type or the second traffic type;

an extension that indicates whether the traffic data is the first traffic type or the second traffic type; and virtual local area network tagging, wherein a dedicated virtual local area network is provided for the second traffic type.

18. The wireless device as claimed in claim 17, wherein the extension comprises sub-network access protocol (SNAP), wherein the SNAP indicates whether the traffic data is the first traffic type or the second traffic type.

19. A non-transitory computer readable storage medium storing a computer program comprising instructions that, when executed on at least one processor of a Wireless Local Area Network Access Point (WLAN AP) operating in an integrated wireless communications network comprising a WLAN and a cellular communications network, causes the at least one processor to:

receive traffic data from a wireless device, the traffic data incoming to the WLAN AP via a WLAN air interface;

determine whether the traffic data is a first traffic type to be routed locally within the WLAN or a second traffic type to be routed to the cellular communication network; and control how the traffic data is handled according to whether the traffic data is the first traffic type or the second traffic type, wherein the processor is configured to determine the type of the traffic data using an extension provided in a logical link control (LLC) layer, wherein the extension indicates whether the traffic data is the first traffic type or the second traffic type.

* * * * *